(12) United States Patent
Lee et al.

(10) Patent No.: US 10,361,655 B2
(45) Date of Patent: Jul. 23, 2019

(54) ELECTRICAL INSPECTION METHOD FOR SOLAR CELLS

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Yueh-Mu Lee, Taoyuan (TW); Chun-Yi Chen, Taoyuan (TW); Zun-Hao Shih, Taoyuan (TW); Hwen-Fen Hong, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 0 days.

(21) Appl. No.: 15/258,339

(22) Filed: Sep. 7, 2016

(65) Prior Publication Data
US 2018/0069506 A1  Mar. 8, 2018

(51) Int. Cl.
| | | |
|---|---|---|
| *G01R 31/26* | (2014.01) | |
| *H01L 31/0304* | (2006.01) | |
| *H01L 31/0687* | (2012.01) | |
| *H01L 27/146* | (2006.01) | |
| *G01N 21/35* | (2014.01) | |
| *G01N 21/64* | (2006.01) | |
| *G06K 9/00* | (2006.01) | |
| *H02S 50/15* | (2014.01) | |

(52) U.S. Cl.
CPC .................. *H02S 50/15* (2014.12)

(58) Field of Classification Search
CPC ........ G01R 31/26; G01N 21/35; G01N 21/64; G06K 9/00; H01L 31/0304; H01L 31/0687; H01L 27/146; H02S 50/15
USPC ....... 324/500, 501, 761.01, 762.01; 250/206, 250/208.1, 330, 339, 339.14, 340, 458.1, 250/459; 382/141, 145; 136/252
See application file for complete search history.

(56) References Cited

U.S. PATENT DOCUMENTS

| | | | | |
|---|---|---|---|---|
| 2008/0202383 A1* | 8/2008 | Shi | ......................... | B82Y 20/00 106/286.6 |
| 2008/0302416 A1* | 12/2008 | Wolfe | ............. | H01L 31/022466 136/256 |
| 2009/0014061 A1* | 1/2009 | Harris, Jr. | ........... | H01L 31/0304 136/255 |
| 2010/0150428 A1* | 6/2010 | Andreev | ................ | G01N 21/66 382/145 |
| 2011/0241719 A1* | 10/2011 | Shr | ........................ | H02S 50/10 324/761.01 |
| 2011/0255772 A1* | 10/2011 | Zimmermann | ........ | G01N 21/66 382/145 |

(Continued)

*Primary Examiner* — Neel D Shah
(74) *Attorney, Agent, or Firm* — Rosenberg, Klein & Lee (57) ABSTRACT

The present invention discloses an electrical inspection method for solar cells, comprising steps of supplying a voltage and a current to a solar cell for stimulating the solar cell and giving a ray of light; filtering the light to give a ray of light having a predetermined wavelength; and measuring an optical power value of the light having a predetermined wavelength. The electrical inspection method adopts a low-cost apparatus to replace the solar simulators according to the prior art. In addition to saving costly equipment, filter adjustment, and the maintenance fee for replacing lamps, the defect inspection flow for solar cells can be further integrated and hence improving the efficiency.

7 Claims, 6 Drawing Sheets

(56) References Cited

U.S. PATENT DOCUMENTS

| | | | |
|---|---|---|---|
| 2011/0297213 A1* | 12/2011 | Tsutagawa | H01L 31/0687 |
| | | | 136/255 |
| 2012/0126120 A1* | 5/2012 | Fuyuki | G01R 31/2605 |
| | | | 250/330 |
| 2012/0223733 A1* | 9/2012 | Gunawan | G01R 31/26 |
| | | | 324/761.01 |
| 2012/0313661 A1* | 12/2012 | Jungwirth | G01N 21/9501 |
| | | | 324/761.01 |
| 2013/0026438 A1* | 1/2013 | Wang | H01L 45/1233 |
| | | | 257/4 |
| 2014/0043056 A1* | 2/2014 | Baba | G01N 21/6489 |
| | | | 324/761.01 |
| 2015/0083192 A1* | 3/2015 | Nobori | H01L 31/0687 |
| | | | 136/246 |
| 2015/0200724 A1* | 7/2015 | Yang | H04B 10/07953 |
| | | | 398/26 |
| 2015/0364631 A1* | 12/2015 | Aiken | H01L 31/0504 |
| | | | 136/251 |
| 2017/0237396 A1* | 8/2017 | Zimmermann | H02S 50/15 |
| | | | 382/149 |

* cited by examiner

ELECTRICAL INSPECTION METHOD FOR SOLAR CELLS

FIELD OF THE INVENTION

The present invention relates generally to an inspection method for solar cells, and particularly to an electrical inspection method for solar cells.

BACKGROUND OF THE INVENTION

The 21st century is a generation with rapidly developing technologies. No matter in industries or daily lives, automation is the same direction of development. Correspondingly, the reliance and demand on power have been increasing worldwide. Exhaustion of power has become the issue many developed and developing countries have to face, enabling strategies for renewable energy to be developed.

Currently, solar power generation is one of the main developed renewable energy sources. According to the technology, solar cells are used to receive the solar energy and convert it into electrical energy. A solar cell is formed by joining a p-type semiconductor and an n-type semiconductor to form the positive and negative electrodes. Based on the photoelectric effect principle, the energy of photons separates the positive and negative charges in the semiconductor materials and generating electron-hole pairs. The electrons and holes move towards the positive and negative electrodes, respectively, to generate currents. According to the types of semiconductor materials, solar cells can be classified into single-crystalline silicon, polysilicon, amorphous silicon, III-V compound, and II-VI compound solar cells. Among them, the photoelectric conversion efficiency of III-V solar cells is the greatest. Accordingly, the industry and research institutes devote in optimizing the performance and process of III-V solar cells.

The quality of solar cells determines the performance of solar-cell modules. Because semiconductors are thin and brittle and their fabrication is complicated, structural defects are easily formed during the fabrication process. In order to avoid waste in manufacturing costs as well as improving the yield of end products, defect inspection must be performed before and after modularizing solar cells for guaranteeing the quality and performed of the cells. That is to say, defects should be filtered by exterior inspection and electrical inspection. The items to be inspected include material defects, sintering waves, contamination, micro cracks, and broken fingers. Among them, material defects, sintering waves, and contamination affect apparently the photoelectric conversion efficiency of solar cells. Thereby, their existence can be filtered by electrical inspection.

The electrical inspection method for solar cells according to the prior art adopts a solar simulator to provide a light source with a spectrum close to that of the sun to illuminate the solar cells. Then the voltage and current values generated in the solar cells are measured. According to the data, the solar cells are sorted. Thereby, the performance of the solar simulator will influence the inspection result directly. According to the international standard and regulations, solar simulators can be classified according to radiation luminance, spectral match, intensity uniformity, and instability of irradiance. In addition, the lamp usually adopted in solar simulators is a xenon lamp or a halogen lamp. Although they have great light fluxes and their spectra are close to the spectrum of the sun, they require high-voltage and stable power supplies to maintain their performance, resulting in costly equipment. Moreover, the lifetime of lamps is short, and the filters should be adjusted periodically. Hence, the inspection cost is raised.

In order to reduce the cost of the fabrication as well as improving the efficiency of solar cells, the present invention reduces the cost of inspection equipment by providing a low-cost and rapid electrical inspection method for solar cells.

SUMMARY

An objective of the present invention is to provide an electrical inspection method for solar cells, which stimulates a solar cell to produce a ray of light and measure an optical power value for replacing illuminating solar cells using a solar simulator and measuring voltage and current values according to the prior art. Thereby, the equipment cost can be reduced and the inspection flow for defects in solar cells can be integrated.

In order to achieve the above objective, the present invention discloses an electrical inspection method for solar cells. A voltage and a current are supplied to a solar cell for stimulating the solar cell to produce a ray of light. After the light is filtered, a ray of light having a predetermined wavelength is given. Next, an optical power value of the light having a predetermined wavelength is measured. Then the performance of the solar is judged according to the value of the optical power value. Because no solar simulator is used, the cost for inspect equipment is reduced and the inspection efficiency is improved.

According to an embodiment of the present invention, the solar cell is a III-V compound solar cell.

According to an embodiment of the present invention, the solar cell is a single-junction or a multi junction solar cell.

According to an embodiment of the present invention, in the step of stimulating the single-junction solar cell to produce the light, the range of the wavelength of the light is between visible light and near infrared.

According to an embodiment of the present invention, the wavelength of the light having a predetermined wavelength produced by the single-junction solar cell is 400~1500 nanometers.

According to an embodiment of the present invention, the wavelength of the light having a predetermined wavelength produced by the multi junction solar cell corresponds to the wavelength of the light produced by stimulating a current-limit layer.

According to an embodiment of the present invention, in the step of filtering the light, an optical grade filter is adopted for filtering the light.

According to an embodiment of the present invention, in the step of measuring the optical power value, an optical power meter is adopted for measuring.

According to an embodiment of the present invention, after the step of stimulating the solar cell to produce the light, a charge-coupled device (CCD) can be adopted for taking a grayscale image.

DETAILED DESCRIPTION

In order to make the structure and characteristics as well as the effectiveness of the present invention to be further understood and recognized, the detailed description of the present invention is provided as follows along with embodiments and accompanying figures.

The present embodiment provides an electrical inspection method for solar cells, which replaces illuminating solar cells using a solar simulator and measuring voltage and current values according to the prior art. Thereby, the equipment cost and the maintenance cost for filter calibration and light sources replacement can be saved. In addition, the inspection speed can be accelerated.

Before solar cells are packaged or modularized, defect inspection is required for removing bad products. The strategies of defect inspection include exterior defect inspection and electrical inspection. Currently, the electrical inspection method is to use a solar simulator to illuminate solar cells. Then the voltage and current values of the solar cells are measured and used as the basis for judging the performance of the solar cells. Unfortunately, solar simulators are expensive and require long-term maintenance fees. Accordingly, the present invention makes use of the electroluminescence (EL) principle to build an electrical inspection method for solar cells.

Electroluminescence, also called electric-field-induced luminescence, is the chemical luminescence reaction generated by conducting currents or electric field through chemical materials. To elaborate, in electroluminescence, owing to massive injection of carriers into semiconductor materials, electrons and holes recombine and irradiate. The excited electrons release energy and generate photons, leading to chemical luminescence. According to the present invention, a voltage and a current are supplied to a solar cell for enabling the solar cell to irradiate for performing electrical inspection.

According to the types of semiconductor materials, solar cells can be classified into single-crystalline silicon, polysilicon, amorphous silicon, III-V compound, and II-VI compound solar cells. The III-V compounds are formed by Group III elements, including boron, aluminum, gallium, and indium, and Group V elements, including nitrogen, phosphorus, arsenic, and antimony, of the periodic table. The main III-V compounds include gallium arsenide (GaAs), indium phosphide (InP), and gallium nitride (GaN). Furthermore, the structures include single-junction and multi junction structures. Single-junction structures are formed by GaAs/Ge. Multi junction structures mean stacking two or more III-V compounds. The usual multi junction structures include GaInP/GaAs or GaInP/GaInAs/Ge structures. Thanks to the stacks of heterogeneous materials, multi junction structures extend the range of absorption wavelengths and hence improving the usage of solar cells. Consequently, multi junction solar cells are gradually adopted.

The embodiment of the present invention is used for, but not limited to, inspecting III-V compound solar cells.

Figure 1:
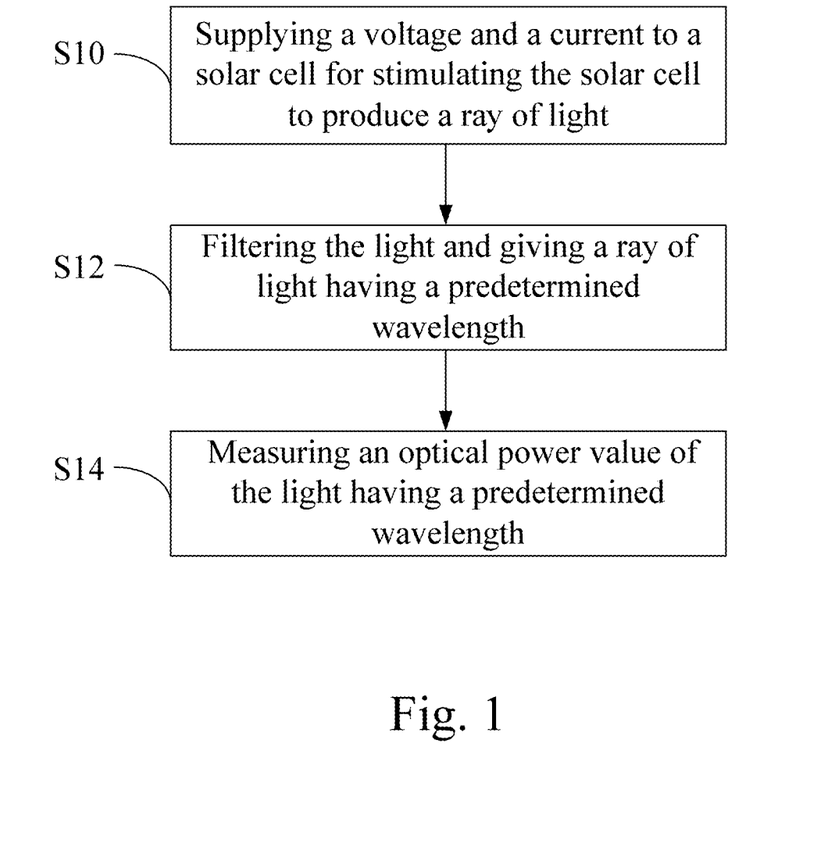
FIG. 1 shows a flowchart of the present invention.

Please refer to FIG. 1, which shows a flowchart of the present invention. As show in the figure, the electrical inspection method for solar cells according to the present invention comprises the following steps:

Step S10: Supplying a voltage and a current to a solar cell for stimulating the solar cell to produce a ray of light;

Step S12: Filtering the light and giving a ray of light having a predetermined wavelength; and Step S14: Measuring an optical power value of the light having a predetermined wavelength.

Figure 2:
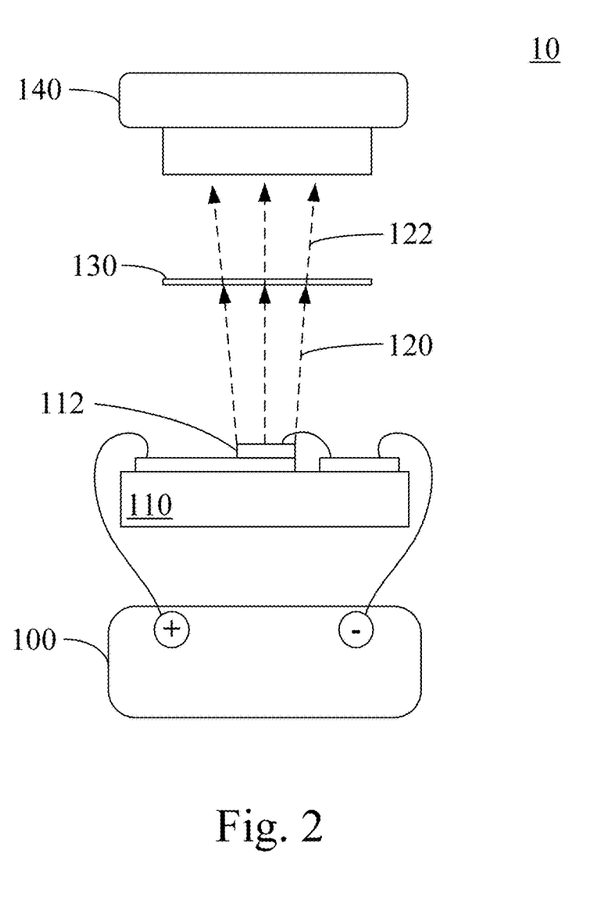
FIG. 2 shows a schematic diagram of the inspection apparatus according to the present invention.

Please refer to FIG. 2, which shows a schematic diagram of the inspection apparatus according to the present invention. As show in the figure, an inspection apparatus 10 comprises a power supply 100, a carrying board 110, a solar cell 112, a ray of light 120, a ray of light having a predetermined wavelength 122, a filter 130, and an optical power meter 140. The solar 112 is disposed on the carrying board 110. The filter 130 is disposed between the solar cell 112 and the optical power meter 140. The light 120 is filtered by the filter 130 and giving the light having a predetermined wavelength 122.

Figure 3:
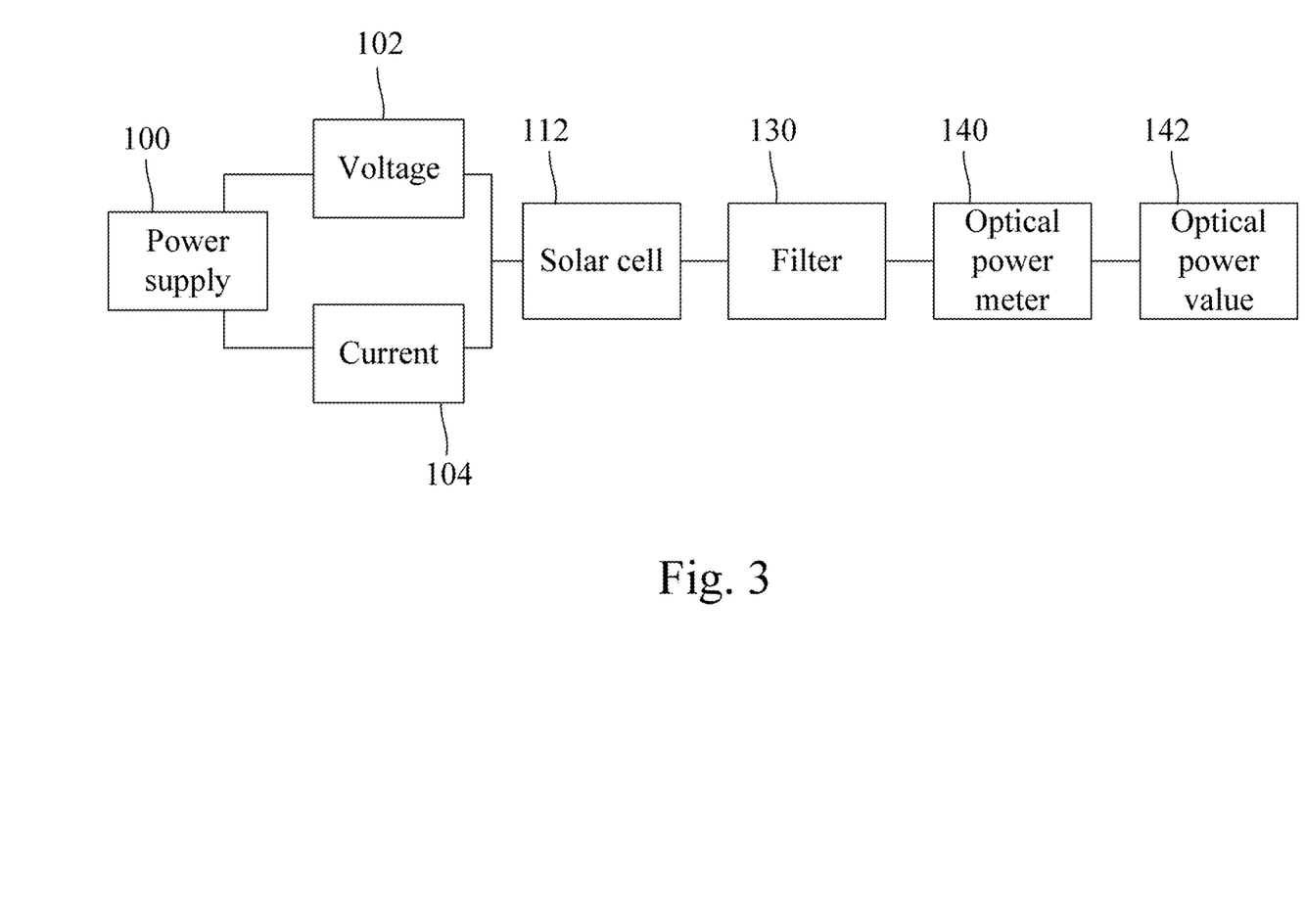
FIG. 3 shows a block diagram according the first embodiment of the present invention.

Please refer to FIG. 3, which shows a block diagram according the first embodiment of the present invention. As show in the figure, the inspection apparatus 10 according to the present invention supplies a voltage 102 and a current 104 by the power supply 100. In addition, by measuring through the optical power meter 140, an optical power value 142 is given.

Next, the electrical inspection methods for a single-junction solar cell and a triple-junction solar cell will be described. Please refer to FIGS. 1, 2, and 3. If the single-junction solar cell is to be inspected, the followings steps should be executed:

Step S10: The power supply 100 supplies the voltage 102 and the current 104 to the solar cell 112 for stimulating the solar cell 112 to produce the light 120 having a wavelength between the visible light and near infrared. The power supply 100 is a general power supply without limitations on its rated power.

Step S12: The filter 130 filters the light 120 and gives the light having a predetermined wavelength 122. The filter 130 is an optical grade filter with transmittance over 80% for avoiding the problem of optical loss during the process of filtering the light 120 and hence improving inspection sensitivity and accuracy. The light having a predetermined wavelength 122 as described above corresponds to the measurable wavelength range of the optical power meter 140. It means that by filtering the light 122 using the filter 130, only the band to be measured can pass through the filter 130 and thus enhancing inspection sensitivity. To elaborate, the wavelength range from the visible light to near infrared is between 380 and 2000 nm. By filtering the light 120 using the filter 130, the light with a wavelength between 400 and 1500 nm will pass.

Step S14: The optical power meter 140 measures the light having a predetermined wavelength 122 and gives an optical power value 142. The optical power meter 140 can measure the light in the band ranging from the visible light to near infrared. In addition, the optical power value 142 represents light intensity and can be used for judging the performance of the solar cell 112.

According to the above electrical inspection method for solar cells, the inspection apparatus 10 first inspects a solar cell without structural defects and having good performance. The measured optical power value 142 is used as a standard value. Next, according to the inspection method of the present invention, the optical power value 142 is measured. Compare the optical power value 142 with the standard value. If the optical power value 142 is greater than the standard value, it means that the electrical performance of the solar cell is qualified. Otherwise, once the optical power value 142 is smaller than the standard value, it means that the electrical performance of the solar cell is bad.

In the following, the inspection method for the triple-junction solar cell will be described. A triple-junction solar cell is formed by stacking solar cells with three different energy bandgaps. As the currents flow in series, the layer with the least current, named the current-limit layer, will determine the performance of the cell. Please refer to FIG. 4A and FIG. 4B, which show schematic diagrams of the first triple-junction solar cell and the second triple-junction solar cell according to the present invention. As shown in the figures, the first triple-junction solar cell 20 comprises a current-limit layer 200, while the second triple-junction solar cell 30 comprises a current-limit layer 300.

According to the present embodiment, inspections will be performed on the current-limit layers. The differences in the inspection methods for the triple-junction solar cell and the single-junction solar cell are the steps S10 and S12 as described in the following. Please refer to FIGS. 1 to 4. If the triple-junction solar cell is to be inspected, the following steps should be performed:

Step S10: The power supply 100 supplies the voltage 102 and the current 104 to the solar cell 112 for stimulating the solar cell 112 to produce the light 120. The wavelength range of the light 120 depends on the materials of the triple-junction solar cell. The materials include III-V compounds containing phosphorus and arsenic. The wavelength ranges between the visible light and near infrared.

Figure 4A:
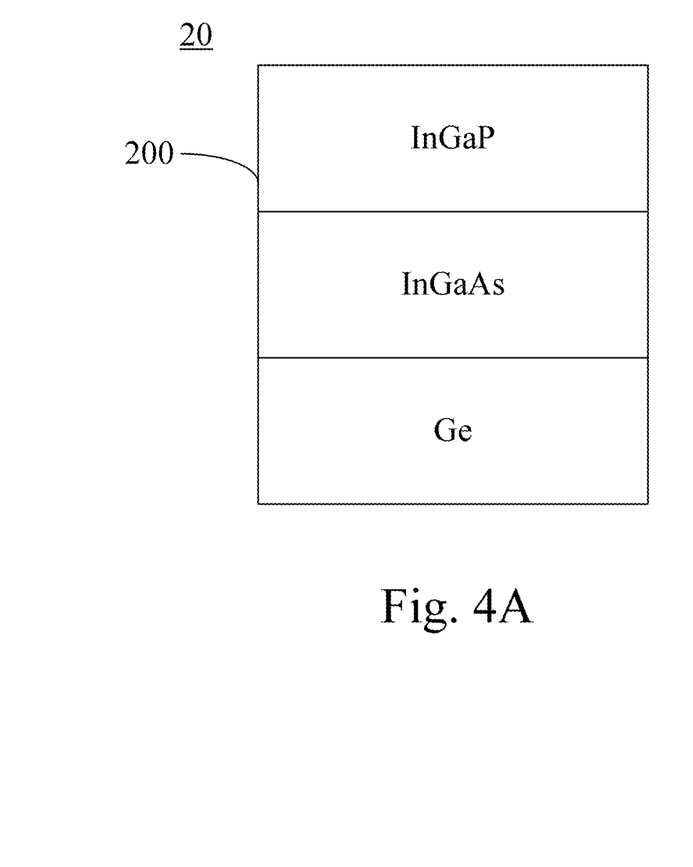
FIG. 4A shows a schematic diagram of the first triple-junction solar cell according to the present invention.
Figure 4B:
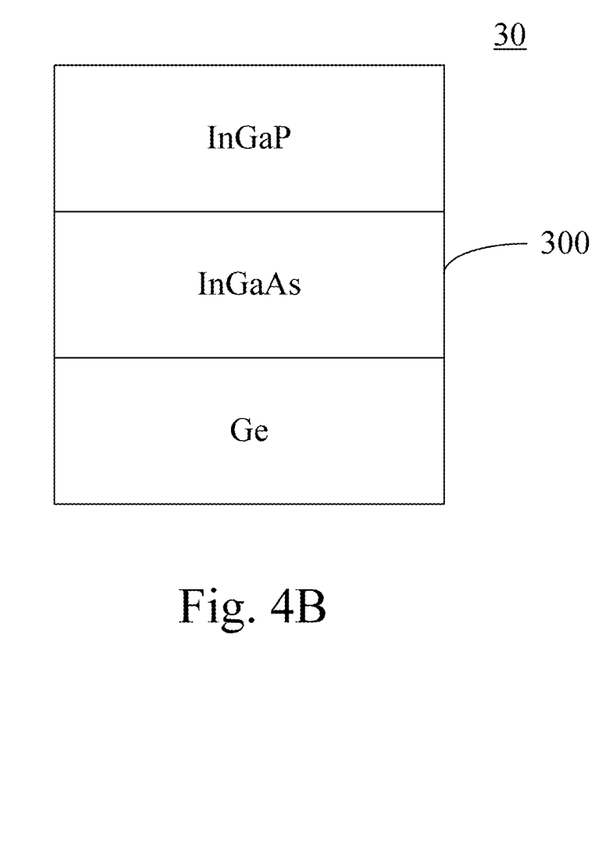
FIG. 4B shows a schematic diagram of the second triple-junction solar cell according to the present invention.

Step S12: The filter 130 filters the light 120 and gives the light having a predetermined wavelength 122. To elaborate, the current-limit layer 200 is InGaP. Then the wavelength of the filtered light having a predetermined wavelength 122 is 300~700 nm. The current-limit layer 300 is InGaAs. Then the wavelength of the filtered light having a predetermined wavelength 122 is 700~900 nm. The remaining step is identical to the inspection step for the single-junction solar cell. Hence, it will not be described again.

According to the electrical inspection method for solar cells of the present invention, after the above step S10 for stimulating the solar cell to produce the light 120, a CCD can be used for extracting a grayscale image of the solar cell. Then the performance of the solar cell can be judged according to the brightness of the grayscale image.

Figure 5:
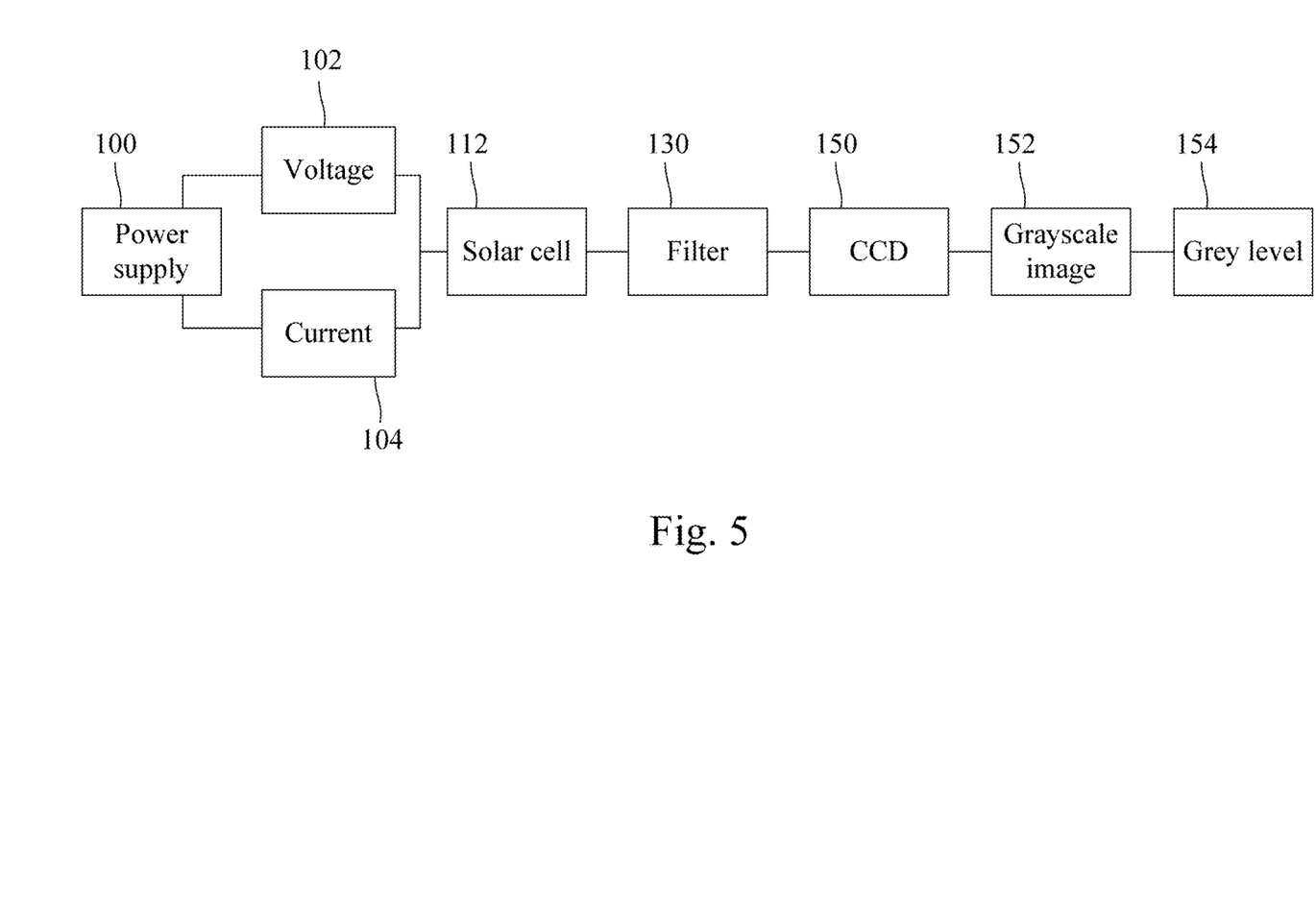
FIG. 5 shows a block diagram according the second embodiment of the present invention.

Please refer to FIG. 5, which shows a block diagram according the second embodiment of the present invention. As shown in the figure, the inspection apparatus of the present invention uses the power supply 100 to supply a voltage 102 and a current 104. Then the CCD 150 is used for taking the grayscale image 152. Afterwards, software is used for binarizing the grayscale image 152 and giving a grey level 154.

Figure 6A:
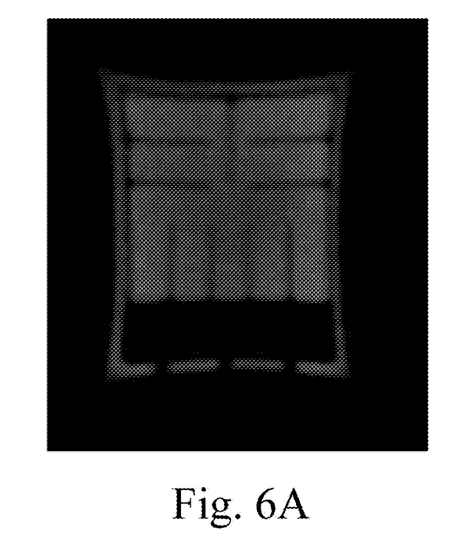
FIG. 6A shows the first grayscale image of the present invention.
Figure 6B:
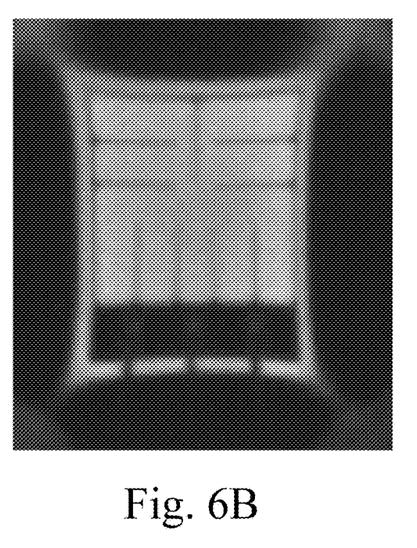
FIG. 6B shows the standard grayscale image of the present invention.
Figure 6C:
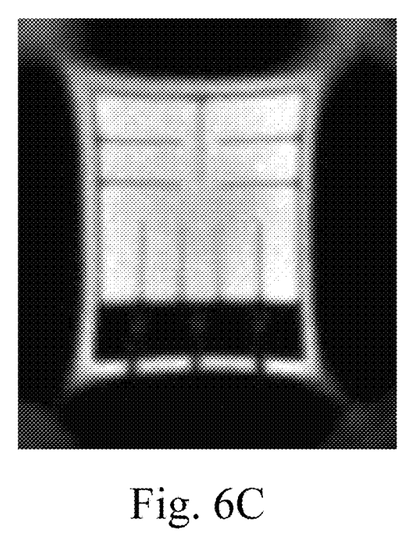
FIG. 6C shows the second grayscale image of the present invention.

Please refer to FIGS. 6A to 6C, which show the first grayscale image, the standard grayscale image, and the second grayscale image of the present invention. Before executing the inspection method according to the present embodiment, a solar cell without structural defect and having excellent electrical performance is first photographed to give a standard grayscale image, as shown in FIG. 6B. Next, according to the inspection method of the present invention, the grayscale image 152 is given. Then the grayscale image 152 is compared to the standard image in their brightness. As shown in FIGS. 6A to 6C, FIG. 6A is darker than the standard grayscale image (FIG. 6B), meaning that the electrical performance of the solar cell is bad. FIG. 6C is lighter than the standard grayscale image (FIG. 6B), meaning that the electrical performance of the solar cell is qualified.

Furthermore, software can be used to binarize the grayscale image to give the grey level 154. If the grey level 154 is greater than the grey level of the standard grayscale image, it means that the electrical performance of the solar cell is bad. If the grey level 154 is smaller than the grey level of the standard grayscale image, it means that the electrical performance of the solar cell is qualified.

The electrical inspection method for solar cells according to the present invention can be performed before packaging and modularizing solar cells. In addition to guaranteeing the quality of end products, structural defects induced during the manufacturing process can be excluded as well. Alternatively, the inspection can be performed after modularization of solar cells for excluding the influences of structural defects induced during the modularization process on the performance of solar cells.

To sum up, the electrical inspection method for solar cells according to the present invention adopts low-cost components, including the power supply, the filter, and the optical power meter, to build an electrical inspection apparatus and replace solar simulators according to the prior art on electrical inspection. Thereby, expensive equipment and the maintenance fee for filter calibration and lamps replacement can be saved, thus reducing inspection costs. In addition, according to the electrical inspection method for solar cells, the electrical performance of solar cells can be judged by the optical power value and the grayscale image. Hence, the inspection accuracy can be improved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An electrical inspection method for multi junction solar cells, comprising:

supplying a voltage and a current from a power supply to a multi junction solar cell having a plurality of layers, said plurality of layers including a current-limit layer having a least current of the plurality of layers, said multi-junction solar cell thereby stimulated by said voltage and current to produce a ray of light;

selectively filtering said ray of light through a filtering element to produce a filtered ray of light having a predetermined wavelength corresponding to said current-limit layer and excluding wavelengths corresponding to the other layers of the plurality of layers;

measuring an optical power value of said filtered ray of light through an optical power meter, wherein said measured optical power value represents a light intensity of said filtered ray of light; and actuating an inspection apparatus to compare said optical power value with a predetermined standard power value for judging the performance of said multi-junction solar cell.

2. The electrical inspection method for multi junction solar cells of claim 1, wherein a wavelength of said ray of light ranges between visible light and near infrared light when said ray of light is produced by stimulation.

3. The electrical inspection method for multi junction solar cells of claim 1, wherein said predetermined wavelength of said filtered ray of light ranges between visible light and near infrared light.

4. The electrical inspection method for multi junction solar cells of claim 1, wherein said predetermined wavelength of said filtered ray of light is between 400 and 1500 nanometers.

5. The electrical inspection method for multi junction solar cells of claim 1, wherein said filtering element is an optical grade filter.

6. The electrical inspection method for multi junction solar cells of claim 1, further comprising taking a grayscale image using a charge-coupled device (CCD) after said stimulating of said solar cell to produce said ray of light.

7. The electrical inspection method for multi junction solar cells of claim 1, wherein said current-limit layer of said multi junction solar cell is InGaP material placed on a top layer.

* * * * *